(12) United States Patent
Dawson

(10) Patent No.: US 8,077,774 B1
(45) Date of Patent: Dec. 13, 2011

(54) AUTOMATED MONITORING OF DIGITAL VIDEO IMAGE QUALITY

(75) Inventor: Benjamin Dawson, Wellesley, MA (US)

(73) Assignee: Volicon, Inc., Burlington, MA (US)

( * ) Notice: Subject to any disclaimer, the term of this patent is extended or adjusted under 35 U.S.C. 154(b) by 484 days.

(21) Appl. No.: 12/417,968

(22) Filed: Apr. 3, 2009

Related U.S. Application Data

(60) Provisional application No. 61/042,079, filed on Apr. 3, 2008.

(51) Int. Cl.
*H04N 7/12* (2006.01)
*H04N 11/02* (2006.01)
*H04N 11/04* (2006.01)
*H04N 7/16* (2011.01)
*G06K 9/40* (2006.01)
*G06K 9/36* (2006.01)

(52) U.S. Cl. ............. 375/240.02; 382/268; 725/148

(58) Field of Classification Search ............. 375/240.02
See application file for complete search history.

(56) References Cited

U.S. PATENT DOCUMENTS

2006/0218619 A1* 9/2006 Dommisse et al. ......... 725/148
2007/0071356 A1* 3/2007 Caviedes et al. ............ 382/268

* cited by examiner

*Primary Examiner* — Christopher S Kelley
*Assistant Examiner* — Hee-Yong Kim
(74) *Attorney, Agent, or Firm* — Burns & Levinson LLP; Orlando Lopez

(57) ABSTRACT

A system and method for detecting video stream macroblock errors and pixelation by detecting macroblock artifacts in analog television signals from a conventional set top box.

19 Claims, 7 Drawing Sheets

27
Distributed Digital Image overlaid
with macroblock locations 28    34
Input Analog Image overlaid with
potential MBA positions and
showing exclusion areas in black Examples of MBAs (24) in the analog image and
showing imprecise vertical edges (29) of MBAs

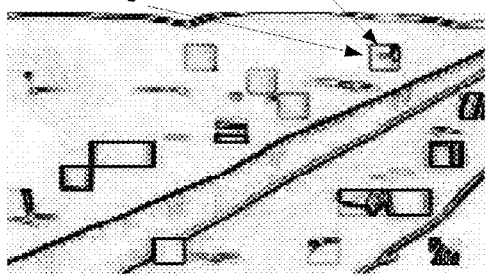
FIG. 7
50 Sobel edge detection kernels
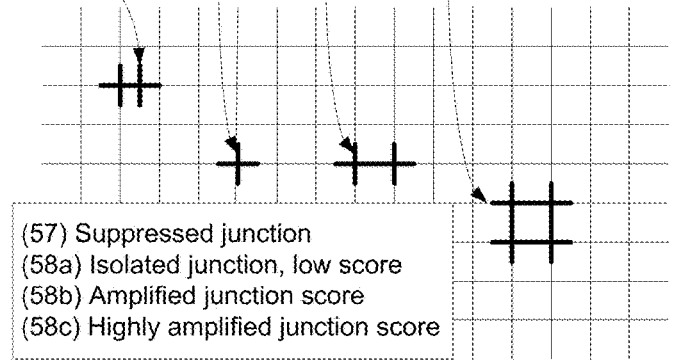
FIG. 8
61 horizatonal edge
61A vertical edge
56 junctions
FIG. 9
(57) Suppressed junction
(58a) Isolated junction, low score
(58b) Amplified junction score
(58c) Highly amplified junction score
FMG's expected junction locations and potential MBA junction locations (+ marks)

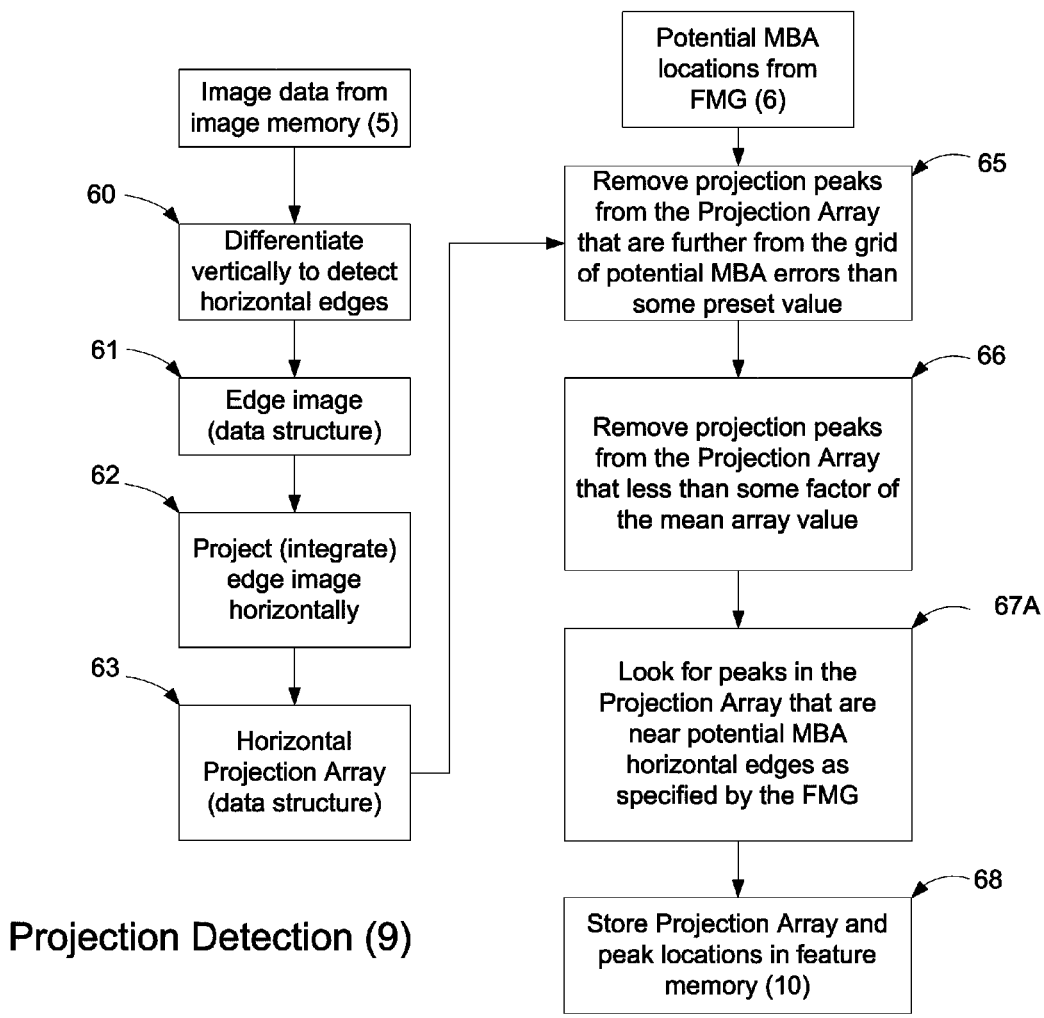
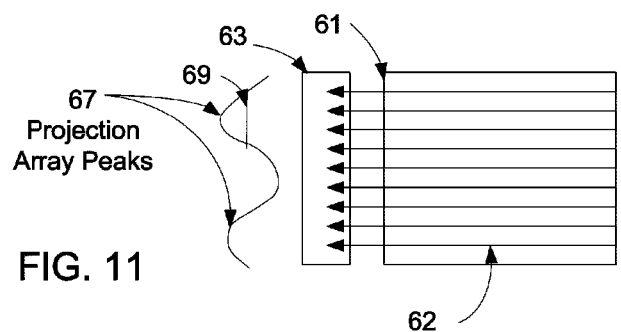

AUTOMATED MONITORING OF DIGITAL VIDEO IMAGE QUALITY

CROSS REFERENCE TO RELATED APPLICATIONS

The present application claims priority to U.S. Provisional Patent Application No. 61/042,079 filed on Apr. 3, 2008, entitled AUTOMATED MONITORING OF DIGITAL VIDEO IMAGE QUALITY which is incorporated herein by reference.

BACKGROUND

The system and method of the present embodiment relate generally to video data processing, and specifically to improving the image quality of video data.

SUMMARY OF THE INVENTION

The needs set forth above as well as further and other needs and advantages are addressed by the present embodiments set forth below.

The present embodiment includes a system and method for automatically monitoring the quality of a video streams, such as television channels, based on detecting macroblock artifacts (MBAs) that appear in block-encoded video streams such as, for example, but not limited to MPEG-2 video streams. Macroblock artifacts visually appear as squares or rectangles in video images and reduce the visual quality of the images.

The method of the present embodiment for automated monitoring of digital video image quality for macroblock artifacts can include, but is not limited to including, the steps of (a) accessing information from a digital video distribution; (b) selecting, decoding, and decompressing the information into an analog signal; (c) digitizing and storing the analog signal into a digital memory; (d) determining a video format of the digitized memory; (e) accessing parameters associated with the video format; (f) creating a macroblock grid based on the video format and the parameters; (g) locating a set of macroblock artifacts based on the macroblock grid, the video format, and the parameters; (h) suppressing image detail that is not associated with the set of macroblock artifacts; (i) locating junctions between the macroblock artifacts in the set of macroblock artifacts; (j) deleting junctions that meet at least one preselected criterion to create a first updated set of junctions; (k) amplifying the first set of junctions based on the proximity of neighboring junctions to create a second updated set of junctions; (l) creating a junction list of amplified junction locations; (m) detecting projections; (n) deleting projection peaks that meet at least one preselected projection criterion to create a second set projection peaks; (o) creating a list of the projection peaks; (p) deleting junctions and projection peaks based on temporal filtering; (q) using the remaining junctions and projection peaks as inputs to a decision network, such as a threshold or neural net; (r) raising an alarm signal to identify at least one macroblock artifact based on the analysis by the decision network.

For a better understanding of the present embodiments, together with other and further objects thereof, reference is made to the accompanying drawings and detailed description.

DESCRIPTION OF THE SEVERAL VIEWS OF THE DRAWING

FIG. 7 is a grid diagram of an exemplary filter for junctions and protections;

FIG. 8 is a pictorial diagram of horizontal and vertical edges;

FIG. 9 is a pictorial diagram of junctions;

FIG. 10 is a flowchart of the steps of projection detection; and

FIG. 11 is a pictorial diagram of projections and projection peaks.

DETAILED DESCRIPTION OF THE INVENTION

The present embodiments are now described more fully hereinafter with reference to the accompanying drawings. The following configuration description is presented for illustrative purposes only. Any computer configuration and architecture satisfying the speed and interface requirements herein described may be suitable for implementing the system and method of the present embodiments.

Figure 1:
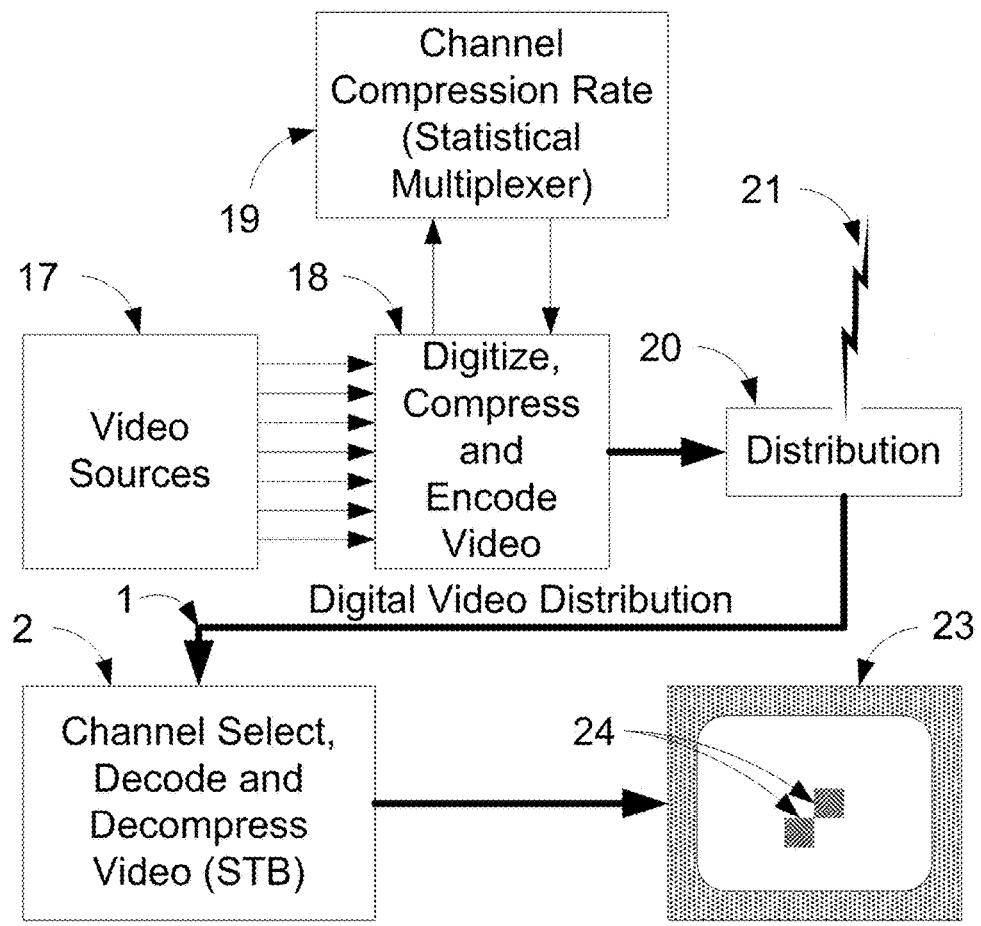
FIG. 1 is a schematic block diagram of the elements of a video distribution system for supplying data to the system of the present embodiment.

Referring now to FIG. 1, data for the system of the present embodiment can be provided information by a video distribution system that can receive digital video from a plurality of video sources 17 which are then compressed 18 and multiplexed 19 for distribution 20 on, but not limited to, a television network cable 1 to viewers. At the viewer's location the digital video is channel selected, decoded, and decompressed by set top box (STB) 2 for display on television screen 23. Noise corruption 21 introduced at any point in the distribution or high compression rates can generate visual artifacts 24 on television screen 23, reducing program visual quality. These visual artifacts 24 can appear as square or rectangular blocks of pixels at incorrect positions or with incorrect color or texture. The present embodiment can detect block visual artifacts 24 from the same STB 2 analog video signal that is sent to television screen 23. Thus visual artifacts 24 introduced at any point in the distribution, up to television screen 23, can be detected.

Continuing to refer to FIG. 1, block compression algorithms, such as MPEG-2, can divide the digital video image into small squares called blocks. In MPEG-2, four blocks in a 2×2 arrangement are processed together and are called a macroblock. Blocks are typically 8×8 pixels so a macroblock would typically be 16×16 pixels. These blocks are arranged in a grid. For example a 640×480 pixel image would have a grid of 40×30 macroblocks, assuming a 16×16 pixel macroblock. Square or rectangular visual artifacts occur when one or more macroblocks is corrupted by, for example, noise or when the digital video data is excessively compressed. These errors are referred to as Macroblock Artifacts (MBAs) as they can have approximately the size of a macroblock and occur near the grid lines that define the macroblock grid. MBAs typically have distinct edges—changes in intensity (luma) or color (chroma)—that can be useful in their detection.

Figure 2:
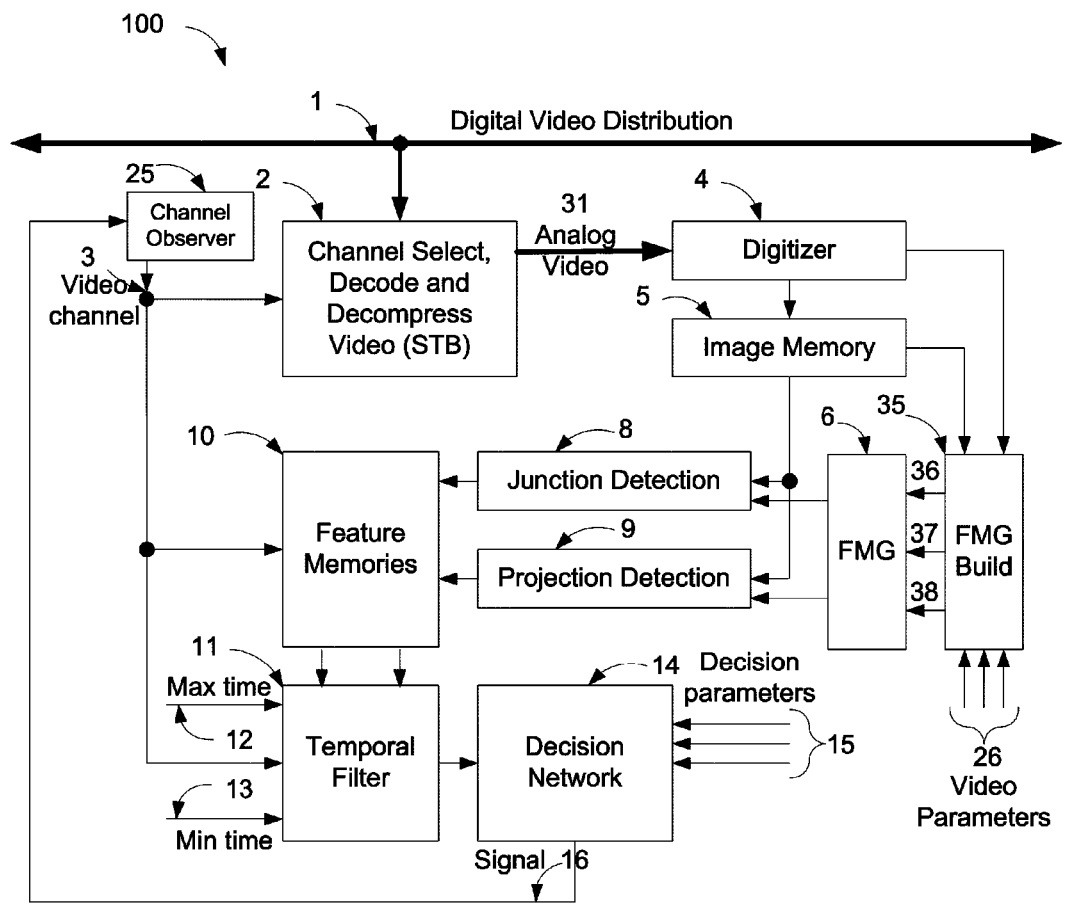
FIG. 2 is a schematic block diagram of the system of the present embodiment.

Referring now to FIG. 2, the video distribution can be provided by, for example, cable or fiber optic network 1. Channel observer 25 can select video channel 3 to monitor for MBAs and can direct STB 2 to tune to video channel 3. STB 2 can then decrypt, decompress, error-correct, and resize the video signal from video channel 3. The processed video signal can be output as an analog or digital signal that could be provided to television 23 (FIG. 1). Analog video 31 from STB 2, such as, for example, component, composite or S-Video, can be used for MBA detection. Analog video 31 can be converted into digital images by digitizer 4 and the digitized images can be stored in at least one image memory 5. Channel observer 25 can specify the duration for monitoring channel 3, for example, five to ten seconds.

Continuing to refer to FIG. 2, STB 2 can convert video formats, such as, for example, various high definition video formats, into one format that is input to digitizer 4. In doing so, rows or columns of pixels might be dropped or scaled (stretched or squeezed) to make the analog video 31 conform to an input format of digitizer 4. This conversion can cause, for example, black lines to be inserted at the top and the bottom of the image or columns of pixels to be removed from either side of the image. Digitizer 4 can provide the input format along with information from image memory 5 and external parameters 26 that are needed to specify the input size and position of the macroblocks and the macroblock grid.

Figure 3A:
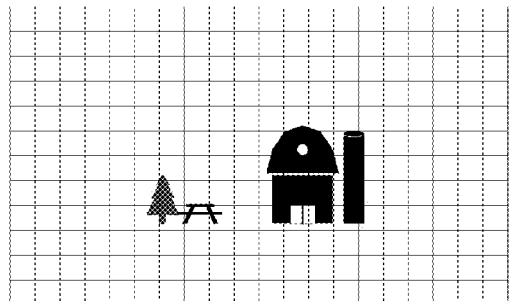
FIGS. 3A and 3B are pictorial diagrams of macroblock grid distortion
Figure 3B:
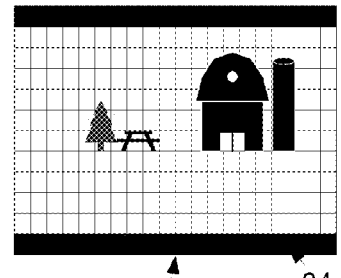

Referring now primarily to FIGS. 3A and 3B, an example of conversion issues is shown. A digital data stream with a known macroblock size and grid 27 (FIG. 3A) has been distorted by the conversion to the standard image size (FIG. 3B). Information on macroblock size and grid as they appear in the standard image size is important for setting up the flexible macroblock grid, to be described. Noise, jitter, and low-pass filtering introduced when STB 2 (FIG. 2) converts video channel 3 (FIG. 2) signal to analog video 31 (FIG. 2), and digitizer 4 (FIG. 2) converts it back to a digital signal, provide uncertainty in macroblock size and grid position.

Figure 4:
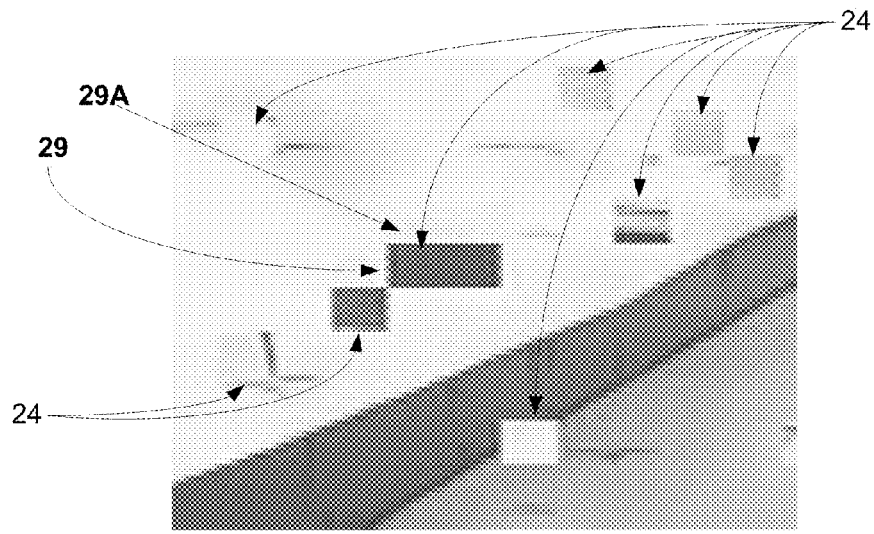
FIG. 4 is a pictorial diagram of exemplary MBAs and macroblock edges.

Referring now primarily to FIG. 4, whereas a digital macroblock grid 27 (FIG. 3A) is, in theory, of known and regular macroblock size, location, and overall image dimensions, the digital data output by digitizer 4 (FIG. 2) can have an unknown macroblock size and unknown macro block dimensions due to the digital to analog to digital conversion processes. Furthermore, visible vertical edges 29 of a macroblock can be blurred and uncertain due to the horizontal scaling by the STB 2 (FIG. 2) and low-pass filtering by digitizer 4 (FIG. 2). Visible horizontal edges 29A of macroblock 24 are sharply defined, but both the vertical and horizontal dimensions of macroblock 24 can change, depending on the input format to STB 2 (FIG. 2) and the standard output image size.

Referring again primarily to FIG. 2, Flexible Macroblock Grid (FMG) 6 can be used to estimate macroblock size and grid location and can provide flexibility in these estimates to deal with the uncertain position of visible vertical edges 29 (FIG. 4) of a potential MBA and some uncertainty in visible horizontal edges 29A (FIG. 4) of a potential MBA. FMG 6 can be computed based on an input image format from digitizer 4, information from at least one image memory 5, and parameters 26. The input format from digitizer 4 can be fixed at, for example, 640×480 pixels and can be used in computing FMG 6. The number of black lines 34 (FIG. 3B) at the top and bottom of standard size input image 28 (FIG. 3B) in image memory 5 can be measured to help compute the input format of STB 2. Parameters 26 of video format information per channel or source can be used to specify the input format of STB 2. In addition, parameters 26 to FMG 6 can specify the settings of STB 2, for example how it resizes a large format video to a smaller one for digitizer 4. This totality of information can be sufficient to estimate the size of macroblocks and the position of macroblock grid 27 (FIG. 3A) in digitized image memory 5. In particular, a vertical offset (Y_Offset) of macroblock grid 27 (FIG. 3A) and a horizontal offset (X_Offset) of macroblock grid 27 (FIG. 3A) can be specified along with a measure of how flexible macroblock grid 27 (FIG. 3A) can be, that is, tolerances that can be allowed in a single macroblock's horizontal or vertical movement with respect to the estimated macroblock grid position. These two values are known as Y_Tol and X_Tol.

Continuing to refer primarily to FIG. 2, specifying an exact spacing and size of macroblock grid 27 (FIG. 3A) in the vertical direction is possible because video lines can be digitized with little change in position and a pre-selected change in image macroblock size. This means that Y_Tol can be quite small, typically zero, meaning that the macroblock grid lines do not move from their position estimated by FMG 6. If the size and spacing of macroblock grid 27 is less precise due to the STB resizing of the video output input, noise, and low-pass filtering by digitizer 4, an X_Tol of four might be required, meaning that visible vertical edges 29 (FIG. 4) of macroblock 24 (FIG. 4) can vary by four pixels left or right and that the macroblock size can change over a range of plus or minus four pixels. For example, if the standard image macroblock size is sixteen, an X_Tol of four would allow detection of macroblocks between the sizes of twelve and twenty pixels in width. The increasing flexibility in macroblock size and position with increasing tolerances can generate more false alarms. That is, with more potential macroblock positions to examine that are out of the macroblock grid range, the chances for a false alarm due to an edge that is not part of an MBA can increase.

Referring still further to FIG. 2, FMG builder 35 can build FMG 6 on a pixel-by-pixel or line-by-line basis rather than being specified implicitly by fixed macroblock size values. When FMG 6 is built in this way, FMG 6 can consist of an X,Y table that the detection algorithms can access to know more precisely where the macroblocks are expected to be. For example, if an algorithm is analyzing a row of macroblocks, it can query FMG 6 for the next expected macroblock position in the row and move the analysis to that position. Thus, non-uniform macroblock horizontal and vertical size and spacing can be accommodated by FMG 6. Non-uniform spacing might be due to, for example, non-linear anamorphic image resizing or sampling clocks that drift in a consistent way across an image.

Figure 5:
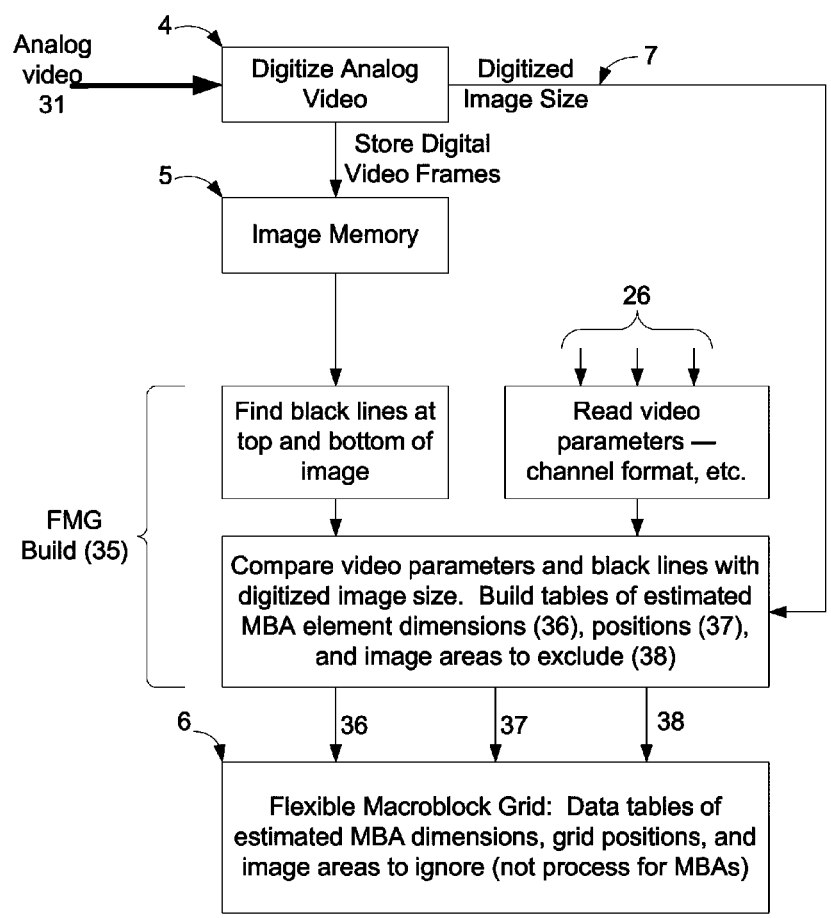
FIG. 5 is a flowchart of the steps to build a flexible macroblock grid.

Referring now primarily to FIG. 5, FMG builder 35 receives digital image video frames from image memory 5, in addition to parameters 26 and digitized image size 7. FMG builder 35 finds black lines 34 (FIG. 3B) at, for example, the top and bottom of the digital image, and then compares parameters 26 and black lines 34 (FIG. 3B) with digitized image size 7. FMG builder 35 builds tables of estimated MBA element dimensions 36, positions 37, and exclusion areas 38 and stores them in FMG 6. FMG 6 includes data tables of estimated MBA dimensions 36, grid positions 37, and exclusion areas 38 which are areas that are ignored and not processed for MBAs.

Figure 6:
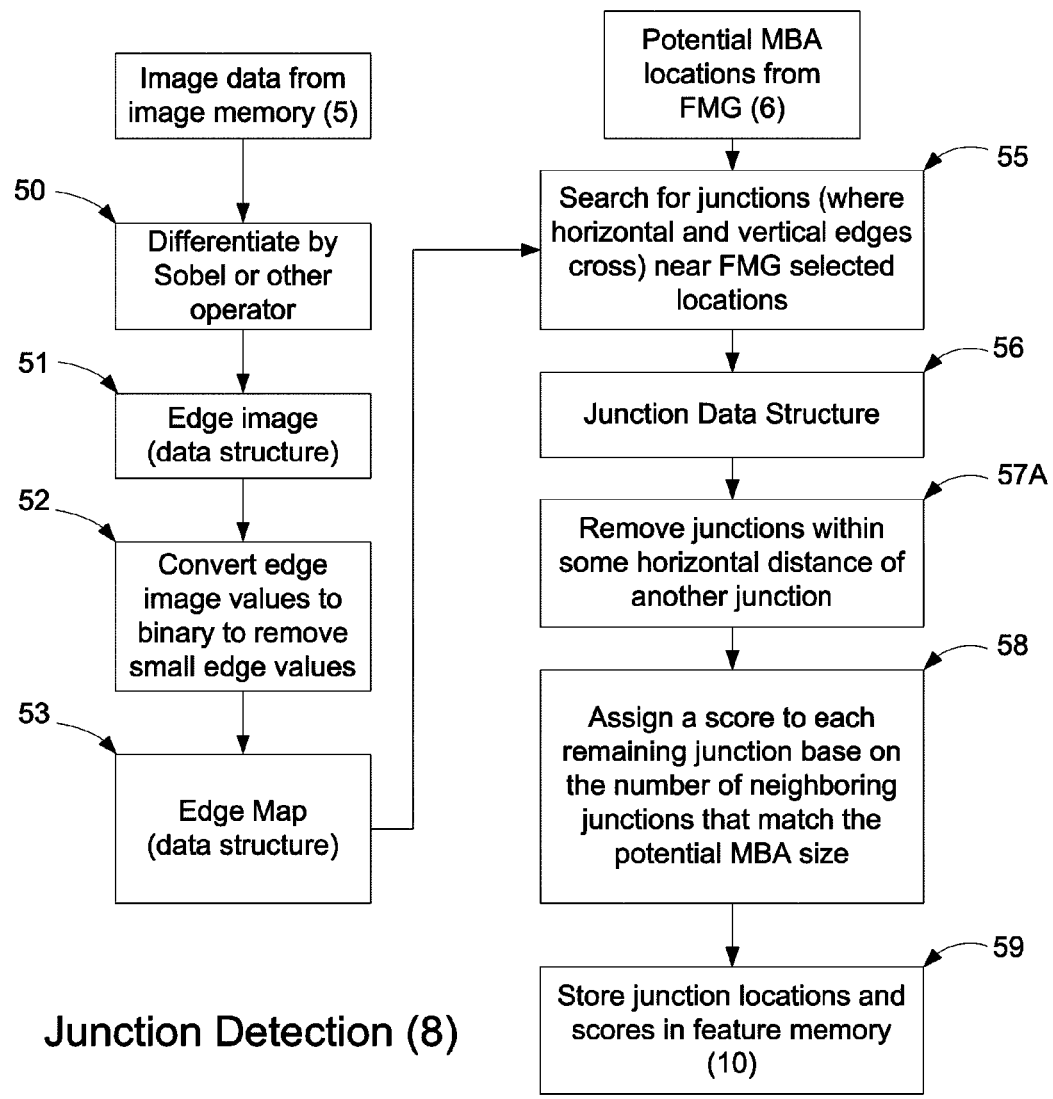
FIG. 6 is a flowchart of the steps of junction detection.

Referring now primarily to FIG. 6, image memory 5 (FIG. 2) and FMG 6 (FIG. 2) can feed junction detector 8 (FIG. 2). Junction detector 8 (FIG. 2) can first apply a small-kernel edge detector, for example, a Sobel edge detector, to an image in image memory 5 (FIG. 2). An edge detector can amplify and select horizontal MBA edges 61 (FIG. 8) and vertical MBA edges 61A (FIG. 8) from edge image 51 and suppress other image detail. The output of the edge detector, derived, for example, from converting 52 edge image 51 to binary to remove small edge values, is an edge map (another image) 53 of edge detector strengths above a preselected threshold. In addition to minimum thresholds for detection, a maximum limit can be specified so that high contrast edges are not marked in edge map 53. In one embodiment, the first and last rows and first and last columns of macroblocks are not processed, as the edge detector would go off the image in these areas. MBA edge detection can be enhanced by the use of color information. In this case the edge detection can be done on the luminance image, and again on the two chroma (color) components stored in image memories 5. The two chroma components can be taken as a vector and the distance between vectors on either side of the potential edge can be a measure of the color shift across the edge. When the average luminance on either side of the edge area being examined is below a threshold, the color edge component may not be considered. The luminance and chroma edge measures can be, but are not limited to being, compared to independent thresholds when deciding to mark a point in the edge map.

Continuing to refer primary to FIG. 6, edge map 53 can be examined 55 to find junctions 56 (FIG. 9)—points where two or more potential MBA edges meet. To detect junctions 56 (FIG. 9), horizontal edges 61 (FIG. 8) and vertical edges 61A (FIG. 8) of potential MBAs are located. FMG 6 (FIG. 5) is accessed to locate horizontal macroblock grid lines, as these have sharper edges and lower position flexibility. Locations in edge map 53 falling on the horizontal macroblock grid lines (plus or minus the specified Y_Tol) will be used to build a run-length encoded list of horizontal MBA edge segments. FMG 6 (FIG. 5) can constrain the image locations examined for potential MBA edges and this can reduce false positives and can increase detection speed. For example, on a 640×480 image with sixteen line high macroblocks and Y_Tol=zero, there are thirty macroblock rows in the macroblock grid. If the first and last row are not processed (because the edge detector would go off the image), there are twenty-eight lines of the image to check for horizontal macroblock edges, or about 6% of the image. The horizontal edges 61 (FIG. 8) of potential MBAs can be, but are not limited to being, detected along a macroblock horizontal grid line as follows: (a) the selected horizontal row in edge map 53 is scanned from left to right and when an edge mark (a pixel value greater than zero) is found that is above a start threshold (Y_Start), that horizontal position is noted; (b) the row scan is continued and edge marks above a second threshold (T_Continue) are counted until the edge map value falls below T_Continue. The two thresholds, assuming T_Continue<T_Start, provide hysteresis such that once a larger threshold has been overcome to start a horizontal edge 61 (FIG. 8), a lower threshold only needs to be met to continue the horizontal edge 61 (FIG. 8); (c) the result is list of run-length encoded horizontal edges 61 (FIG. 8) for this row of the image. That is, a list of the starting position of horizontal edge 61 (FIG. 8) and its horizontal extent (length); (d) the run-length encoded list is examined and horizontal edges 61 (FIG. 8) whose lengths are less than the expected horizontal size of a macroblock (from the FMG tables) minus X_Tol are discarded as being too short to be part of an MBA; (e) this process is repeated for horizontal rows in edge map 53 that are selected by FMG 6 (FIG. 5), and the result is a set of run-length encoded horizontal lines that could be part of an MBA. Vertical edges 61A (FIG. 8) of potential MBAs can be, but are not limited to being, detected along a vertical column of edge map 53 as follows: (a) starting at the horizontal position of the first vertical macroblock edge, as provided by FMG 6 (FIG. 5), this column and the columns on either side of it for a distance of X_Tol are searched for vertical edges 61A (FIG. 8) by scanning from the top of the edge map column to the bottom; (b) the scanning builds up a run-length encoded list of vertical edges 61A (FIG. 8)—their start position and length—for each column; (c) each column's run-length encoded edge list is examined and vertical edges 61A (FIG. 8) whose lengths are less than the expected vertical size of a macroblock (from the FMG tables) minus Y_Tol are discarded as being too short to be part of an MBA; (d) this process is repeated for selected vertical columns in edge map 53. For example, if the nominal size of a macroblock is sixteen in the horizontal direction and X_Tol=four, then seven columns are scanned for each potential vertical macroblock position. On a 640 pixel by 480 line image, 280 columns are scanned or about 44% of the image. To reduce the number of vertical edges 61A (FIG. 8) to be considered as part of a macroblocks, an optional maximum vertical edge length can be set. This value can be, for example, twice the vertical macroblock size plus two. Vertical edge lengths longer than this value can be removed from the run-length edge list for that column.

Continuing to refer primarily to FIG. 6 and FIG. 9, junctions 56 (FIG. 9) are locations where the potential MBA horizontal edges 61 (FIG. 8) and vertical edges 61A (FIG. 8), as encoded in run-length lists, cross. This can be visualized by drawing the detected horizontal edges 61 (FIG. 8) and vertical edges 61A (FIG. 8) and marking junctions 56 (FIG. 9) with a +. For each horizontal edge 61 (FIG. 8) in the run-length list of edges, the following process can be, but is not limited to being, followed by the junction detector 8 (FIG. 6): (a) vertical edges 61A (FIG. 8) that could intersect with that horizontal edge 61 (FIG. 8) are examined; (b) because the edge operator has a one-pixel uncertainty at each end of an edge, the extent of vertical edge 61A (FIG. 8) is considered to be one pixel longer on each end; (c) found junctions 56 (FIG. 9) are counted and their positions are stored in a list for the horizontal row being examined. At the end of this process, a count of junctions 56 (FIG. 9) (corners of a macroblock) in each row and their locations in that row can be produced in a junction list. At this point the total number of junctions 56 (FIG. 9) found in the entire image area used could be used as a measure of MBAs in the image. (d) To reduce the number of spurious junctions 56 (FIG. 9) that could lead to false alarms, a junction suppression step 57A (FIG. 6) can be performed. The horizontal junction lists can be examined to find close junctions 57 (FIG. 9) that are close (clustered) together. For example, the first junction 56 (FIG. 9) in a row list can be used to suppress (remove) subsequent junctions in that row that are within a preselected distance of the first junction 56 (FIG. 9) and within a preselected distance of each other, for example, X_Tol. When there are no more junctions 56 (FIG. 9) to suppress, the next horizontal segment is examined in the same row or if the same segment is longer than a macroblock then start at the next estimated macroblock vertical edge location. For example, if the first junction 56 (FIG. 9) occurs at ten, the next at twelve, then fourteen, then eighteen and the suppression radius is X_Tol=three, then the junction 56 (FIG. 9) at ten would survive as it is the first, and the ones at twelve and fourteen would be suppressed (removed) because they are within X_Tol of the first junction at ten. The junction 56 (FIG. 9) at eighteen would survive but would suppress any subsequent junctions 56 (FIG. 9) that were within three pixels of it. In another embodiment of the suppression, the cluster of junctions 56 (FIG. 9) can be examined and the vertical edge position that most closely matches a vertical edge position that is the expected horizontal macroblock distance away survives. (e) Next the remaining junctions can be, but are not limited to being, subject to junction amplification. In this step, each junction is compared with the junctions immediately above, below, left and right. If the distance between the selected junction 56 (FIG. 9) and any of its four neighbors matches the expected vertical and horizontal distances of the macroblock grid, then the score can be multiplied by, for example, two times the number of spacing matches to form amplified junction score 58*b* (FIG. 9). Similarly, junctions 56 (FIG. 9) on the four diagonals from the selected junction 56 (FIG. 9) can be compared and if any match the expected distance, that score is amplified, for example, forming highly amplified junction score illustrated by highly amplified junctions 58*c* (FIG. 9). Greater weight can be given to spacing matches vertically than horizontally and a different value to diagonal matches. (f) Junction detection 8 (FIG. 6) can assign 58 (FIG. 6) a score to each remaining junction 56 (FIG. 9) based on the number of neighboring junctions 56 (FIG. 9) that match the potential MBA size, and outputs a list of junction locations and the amplified score for each junction 56 (FIG. 9) in the list. Isolated junctions 58*a* (FIG. 9) can be assigned a low score. These data are stored 59 (FIG. 6) in feature memories 10 (FIG. 2) to be used in a subsequent temporal filter 11 (FIG. 2) and decision process 14 (FIG. 2).

Referring now primarily to FIG. 10, projection detection 9 can use a horizontal edge detector 60 similar to that used by junction detector 8 (FIG. 6), for example the horizontal kernel from the Sobel detector 50 (FIG. 7). The absolute value of the horizontal edge detector output is scaled and entered, without thresholding, into a projection edge map. The values in the projection edge map can then be summed (integrated) 62 along each row. The results may be held, for example, in a column the height of the active area of the image, referred to as horizontal projection array 63. Because the position of the top and bottom of the macroblocks can be known, e.g. Y_Tol can be zero, horizontal projection array 63 can be searched for pairs of values that satisfy certain preselected criteria that are at the expected top and bottom of a row of macroblocks. For example, "peaks" 67 (FIG. 11) that are one macroblock height apart in the horizontal projection array 63 and that are on the known position of the top and bottom of a macroblock row can be determined. The presence of a pair of peaks 67 (FIG. 11) can signal a row of MBAs. To reduce the chance of false alarms, the average value of horizontal projection array 63 can be computed, but with the values at the macroblock top and bottoms positions, plus or minus one, excluded 65, that is, the average of all values except for the potential peak locations and the values immediately above and below the potential peak locations. In one embodiment, three values for each row can be excluded 66 because the edge filter can have an effective width of plus or minus one row. This average of all included values is then used as a threshold for detecting pairs of peaks 67 (FIG. 11), as above. For example, the threshold is set to 1.5 times the average off-peak value. In another embodiment, the maximum off-peak value in the array can be used as the threshold basis. The goal in either case can be to suppress 67A reporting a row of MBAs in images that have significant and naturally occurring horizontal edges, for example, a row of square windows in the background. The output of the projection detection is the location of peaks 67 (FIG. 11) that are above a preselected threshold and these data are stored 68 in feature memories 10 (FIG. 2) along with the junction data extracted from the same image.

Referring again primarily to FIG. 2, the data from junction detector 8 and projection detector 9 can be saved in feature memory 10. These data can be saved in different feature memories 10 for each frame in a video and can be saved over some period of time. The purpose of this is to provide a "moving window history" of the junction and projection detection, that is, the junction and projection information for the current and previous N frames. The information in feature memories 10 can be used by temporal filter 11 to remove temporal patterns of potential MBAs from consideration and so to reduce false alarms caused by image structure that is similar to MBA structure but has a different temporal pattern. For example, a horizontal row of square windows might appear similar to MBAs, but they will not have the same temporal characteristics as real MBAs. In the simplest temporal pattern, temporal filter 11 can consider minimum 13 and maximum 12 preselected durations of potential MBAs and can discard potential MBAs that fall outside these temporal bounds. More complex temporal patterns of junction and projection data can be used. For example, a slow and steady change in the potential MBA position indicates that a background with block structure that looks like MBAs is being moved, perhaps by the camera panning across the background.

Continuing to still further refer to FIG. 2, decision network 14 can accept the temporally filtered junction lists and projection detection outputs. In one embodiment, decision parameters 15 that are input to decision network 14 can be preselected thresholds. In another embodiment, decision parameters 15 can be trained weights for neurons in an artificial neural network, for example, the network can create normalized scores from junctions 56 (FIG. 9) and projections 63 (FIG. 11), can weight these by trained weight parameters, can sum the results, and can apply a threshold to the result to declare an alarm or not. Decision network 14 can weight junctions 56 (FIG. 8) and projections 63 (FIG. 11) based on where they occur in the image. Junctions 56 (FIG. 8) and projections 63 (FIG. 11) towards the center of the image can be often given more weight than those at the periphery, as these generate more annoying visual artifacts on television screen 23 (FIG. 1). The duration of a potential MBA can also be recorded by temporal filter 11 and passed to decision network 14. This can allow decision network 14 to give more weight to potential MBAs that persist for many video frames, as these generate more annoying visual artifacts on television screen 23 (FIG. 1). The temporal and spatial (junctions and projections) data can be combined to yield a vector to use in the decision network 14. As a simple example, decision parameters 15 might be set or trained so that signal 16 is raised, for example, only when more than M macroblocks occur in the center X by Y area of the video image and the macroblocks persist for more than N frames.

Continuing to still further refer to FIG. 2, decision network 14 can consider the evidence for a true MBA and if the evidence is strong, can raise signal 16. Signal 16 can be sent to the video provider to indicate a problem with one or more video channels. Signal 16 can be sent to channel observer 25 which can (a) record the video that caused signal 16 so that the video provider can review the video causing signal 16, (b) optionally increase the monitoring time for problematic video channel 3, and (c) optionally return more frequently to monitor problematic video channel 6. When video channel 3 is switched, channel observer 25 can reset and clear feature memories 10 and temporal filter 11.

Continuing to refer to FIG. 2, channel observer 25 can be used to control the duration and frequency of monitoring a particular channel and allowing the results of MBA detection to change the behavior of channel observer 25 such that channels exhibiting MBAs are monitored more frequently and for a longer duration. System 100 can recover the estimated macroblock size and position—the macroblock grid—from the input video image, the image size, and external parameters such as the offset of the macroblock grid (horizontally and vertically), and can construct FMG 6 that can be used to guide the search for potential MBA edges. Horizontal projections 63 (FIG. 11) can be used to detect long runs of macroblock errors. Methods of removing peaks 67 (FIG. 11) that are not on the macroblock grid as specified by FMG 6 and peaks 67 (FIG. 11) that are less than some fraction of the average projection value can be accommodated by system 100. Temporal filtering junctions 56 (FIG. 9) (positions and scores) and projections 63 (FIG. 11) (projection array and peak locations) can remove data that are not likely to be part of a potential MBA and can amplify data that can be accommodated by system 100.

Continuing to refer primarily to FIG. 2, the method of the present embodiment can include, but is not limited to including, the steps of: (a) accessing information from a digital video distribution 1 as selected by channel observer 25; (b) selecting, decoding, and decompressing video channel 3 into analog video 31; (c) digitizing and storing analog video 31 into image memory 5; (d) determining a video format of the image memory 5; (e) accessing video parameters 26 associated with the video format; (g) accessing images stored in at least one image memory 5; (h) creating FMG 6 based on the video format, video parameters 26, and image memory 5; (i) locating potential MBAs locations based on FMG 6; (j) creating an edge image 51 (FIG. 6) using an edge filter 50 (FIG. 7) that selects edges and suppresses details not associated with MBA edges; (k) locating junctions 56 (FIG. 9) between potential MBA horizontal edges 61 (FIG. 8) and vertical edges 61A (FIG. 8); (l) suppressing junctions 56 (FIG. 9) based on neighborhood distances; (m) assigning a score to each of the un-suppressed junction and amplifying that score based on neighboring junctions 58a,b,c (FIG. 9) that match the position of the local macroblock grid; (n) creating a junction list of amplified junction locations; (o) creating projections 63 (FIG. 11) from images filtered with a horizontal edge detector; (p) deleting peaks 67 (FIG. 11) in the projections 63 (FIG. 11) that are off the macroblock grid or compute statistics such as the average projection value of peaks 67 (FIG. 11) and using those statistics to delete peaks 67 (FIG. 11) that are probably not due to MBAs; (q) creating a projection list of projections 63 (FIG. 11) remaining after step (p); (r) storing junctions 56 (FIG. 8) and projections 63 (FIG. 11) in a set of feature memories 10 as a function of time (video frames); (s) temporally filtering junctions 56 (FIG. 8) and projections 63 (FIG. 11) in feature memories 10, either separately or together, to remove junction and projection peak features that do not meet some preselected temporal pattern of MBA durations or movements; (t) applying the remaining junction and projection peak data, along with temporal duration for these features to decision network 14 using decision parameters 15 that can be, for example, fixed or learned, for example, by using a neural net, to make a decision as to the existence of MBAs in the current video frame; and (u) raising signal 16 based on decision network 14 to indicate a possible issue with video channel 3 (FIG. 1) to the video provider, and to change the behavior of channel observer 25 that sequences and controls the channel MBA monitoring. This method can be, in whole or in part, implemented electronically. Signals 16 representing actions taken by elements of system 100 depicted in FIG. 2 can travel over electronic communications media and can be stored on computer-readable electronic media. Control and data information can be electronically executed and stored on computer-readable media. System 100 can be implemented to execute on a node in a video distribution network. Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, and EPROM, a FLASH-EPROM, or any other memory chip or cartridge, a carrier wave, or any other medium from which a computer can read.

Continuing to refer primarily to FIG. 2, the method for automated monitoring of rectangular visual artifacts (MBAs) 24 (FIG. 1) in block-compressed digital videos presented as analog video of another embodiment of the present teachings can include, but is not limited to including, the steps of digitizing analog video 31 into at least one digital image memory 5 having a digital image size 7 (FIG. 5); estimating video and compression block formats from the digital image size 7 (FIG. 5), the at least one digital image memory 5, and video parameters 26; computing exclusion areas 38, of a digital image in the at least one digital image memory 5, that are excluded from further use based on the digital image size 7, the image memory 5, and the video parameters; determining horizontal edges 61 (FIG. 8) and vertical edges 61A (FIG. 8) of potential MBAs; locating a set of junctions 56 (FIG. 9) where the horizontal edges 61 (FIG. 8) and the vertical edges 61A (FIG. 8) cross; deleting, from the set of junctions 56 (FIG. 9), close junctions 57 (FIG. 9); computing a score for each junction 56 (FIG. 9) in the set of junctions 56 (FIG. 9) based on neighboring junctions 58 (FIG. 9); creating an array of horizontal projections 63 (FIG. 9) of the horizontal edges 61 (FIG. 8); suppressing peaks 67 (FIG. 9) in the horizontal projections 63 (FIG. 11) based on positions of the horizontal projections 63 (FIG. 11) with respect to the horizontal edges 61 (FIG. 8), and based on amplitudes 69 (FIG. 11) of the horizontal projections 63 (FIG. 11); storing locations of the junctions 56 (FIG. 9), the scores, the array of horizontal projections 63 (FIG. 11), and the unsuppressed peaks, in a temporal sequence of the potential MBAs of feature memories 10; applying a temporal filter 11 to the temporal sequence to accept or reject the temporal sequence; and detecting MBAs 24 (FIG. 1) in the temporal sequence using a decision network 14; and providing the MBAs 24 (FIG. 1) by a computer signal 16. The method can further optionally include the steps of selecting the analog video 31 by a channel observer 25; reporting the MBAs 24 (FIG. 1) to the channel observer 25; receiving an updated channel selection from the channel observer 25 based on the reported MBAs 24 (FIG. 1); estimating where a potential MBA could occur and potential MBA sizes from the digital image size 7 (FIG. 5), the black lines 34 (FIG. 3B) in the image memory 5, and the video parameters 26; recording the estimated locations and dimensions of the potential MBAs in a flexible macroblock grid (FMG) 6; horizontally and vertically differentiating the digital image in image memory 5 to create an edge map 53 (FIG. 6) including the horizontal edges 61 (FIG. 8) and the vertical edges 61A (FIG. 8) of potential MBAs; and computing the edge map 53 (FIG. 6) based on a local intensity and a color digital derivative magnitude of edges of the potential MBA.

Continuing to still further refer to FIG. 2, in another embodiment, system 100 for automated monitoring of rectangular visual artifacts (MBAs) 24 (FIG. 1) in block-compressed digital videos presented as analog video can include, but is not limited to including, digitizer 4 digitizing analog video 31 into at least one image memory 5 having an image size 7 (FIG. 5); FMG builder 35 estimating video and compression block formats based on said image size 7 (FIG. 5), image memory 5, and video parameters 26, computing exclusion areas 38, of a digital image in image memory 5, that are excluded from further use based on digital image size 7 (FIG. 5), image memory 5, and video parameters, and determining horizontal edges 61 (FIG. 8) and vertical edges 61A (FIG. 8) of potential MBAs; junction detector 8 locating a set of junctions 56 (FIG. 9) where horizontal edges 61 (FIG. 8) and vertical edges 61A (FIG. 8) cross, deleting close junctions 57 (FIG. 9) from junctions 56 (FIG. 9), computing a score for each junction 56 (FIG. 9) in the set of junctions 56 (FIG. 9) based on neighboring junctions 58 (FIG. 9), and storing locations of junctions 56 (FIG. 9) and scores in a temporal sequence of potential MBAs of feature memories 10; projection detector 9 creating an array of horizontal projections 63 (FIG. 11) of horizontal edges 61 (FIG. 11), suppressing peaks 67 (FIG. 11) in horizontal projections 63 (FIG. 11) based on positions of horizontal projections 63 (FIG. 11) with respect to horizontal edges 61 (FIG. 8), and based on amplitudes 69 (FIG. 11) of horizontal projections 63 (FIG. 11), and storing the array of horizontal projections 63 (FIG. 11) and the unsuppressed peaks, in a temporal sequence of said potential MBAs of feature memories 10. System 100 can also include temporal filter 11 applied to the temporal sequence to accept or reject the temporal sequence, and decision network 14 detecting the MBAs 24 (FIG. 1) in the temporal sequence and providing the MBAs 24 (FIG. 1) by a computer signal 16. System 100 can optionally include channel observer 25 selecting said analog video 31. Decision network 14 can report the MBAs 24 (FIG. 1) to channel observer 25, and set top box 2 can receive an updated channel selection from channel observer 25 based on the MBAs 24 (FIG. 1). FMG builder 35 can estimate where a potential MBA could occur and potential MBA sizes from image size 7, black lines 34 (FIG. 3B) in image memory 5, and video parameters 26, and can record estimated locations and dimensions of possible MBAs in a flexible macroblock grid (FMG) 6. FMG builder 35 can horizontally and vertically differentiate the digital image in image memory 5 to create edge map 53 (FIG. 6) including horizontal edges 61 (FIG. 8) and vertical edges 61A (FIG. 8) of potential MBAs. FMG builder 35 can also compute edge map 53 (FIG. 6) based on a local intensity and a color digital derivative magnitude of edges of the potential MBA.

Continuing to refer to FIG. 2, and in yet another embodiment, the method for automated monitoring of rectangular visual artifacts (MBAs) 24 (FIG. 1) in block-compressed digital videos presented as an analog signal 31 can include, but is not limited to including, the steps of: (a) accessing information from a digital video distribution 1 to monitor a video channel 3; (b) selecting, decoding, and decompressing 2 the information into the analog signal 31; (c) digitizing the analog signal 31 (d) storing a digitized image of the analog signal 31 into at least one image memory 5; (e) obtaining a digitized image size 7 from the digitized image; (f) accessing video parameters 26; (g) estimating dimensions 36 and locations 37 of possible MBAs from the digitized image size 7 (FIG. 5), the video parameters 26, and the black lines in the at least one image memory 5; (h) computing exclusion areas 38 of the digital image 5 to exclude from further use, based on the digitized image size 7 (FIG. 5), the video parameters 26, and black lines on the edges of the at least one image memory 5; (i) creating a flexible macroblock grid (FMG) 6 to indicate possible positions of potential MBAs based on the estimated dimensions 36, the estimated locations 37, and the exclusion areas 38; (j) for each of the digitized images, determining locations of vertical edges 61A (FIG. 8) of the potential MBAs based on the FMG 6; (k) differentiating digital image intensity/color of the digitized images to detect horizontal edges 61 (FIG. 8) and vertical edges 61A (FIG. 8) and suppress other image structure to create an edge image; (l) transforming the edge image into an edge map 53 (FIG. 6) to remove low contrast edges from consideration; (m) locating junctions 56 (FIG. 9) where the horizontal edges 61 (FIG. 8) and vertical edges 61A (FIG. 8) cross in the edge map 53 (FIG. 6), the junctions 56 (FIG. 9) being in proximity to the locations 37 and the dimensions 36 in the FMG 6; (n) removing or suppressing the close junctions 57 (FIG. 9); (o) assigning 58 (FIG. 6) a score to each of the unsuppressed junctions based neighboring junctions and the dimensions 36; (p) storing the locations 37 and the scores of the remaining junctions 56 (FIG. 9) in feature memories 10 as a function of time; (q) vertically differentiating 60 (FIG. 6) the digitized image to create a horizontal edge 61 (FIG. 8); (r) integrating the horizontal edge 61 (FIG. 8) to create a horizontal projection array 63 (FIG. 11); (s) updating the horizontal projection array 63 (FIG. 11) to remove peaks 69 (FIG. 11) that are further than a preselected distance from the locations 37 based on the FMG 6; (t) modifying the updated horizontal projection array to remove the peaks 67 (FIG. 11) that are less than a preselected value; (u) searching the modified horizontal projection array 63 (FIG. 11) to find the peaks 67 (FIG. 11) that are near horizontal edges 61 (FIG. 8) of the locations 37 from the FMG 6; (v) storing 68 (FIG. 10) the horizontal projection array 63 (FIG. 11) and the near peaks in the feature memories 10 as a function of time; (w) temporally filtering 11a sequence of the junctions 56 (FIG. 9) and the projections 63 (FIG. 11) in the feature memories 10 to discard sequences of the potential MBAs that are shorter than a preselected minimum time 13 or longer than a preselected maximum time; (x) reporting sequences that are not filtered out by said step of temporally filtering to a decision network 14; (y) determining, by the decision network 14, whether there are MBAs 24 (FIG. 1) in the digitized image based on the junctions 56 (FIG. 9) and the projections 63 (FIG. 11) data in the filtered feature memories and decision parameters 15; and (z) raising signals 16 based on occurrence of the MBAs 24 (FIG. 1). The method can optionally include the steps of selecting a video channel and a channel monitoring duration by a channel observer 25; changing the behavior of the channel observer 25 such that channels where MBAs are detected are monitored more frequently and for a longer duration; and signaling a video provider and the channel observer 25 when a signal 16 is raised.

Although the present teachings have been described with respect to various methods and embodiments, it should be realized these teachings are also capable of a wide variety of further and other methods and embodiments suitable for further and other purposes, all within the scope of the present teachings.

What is claimed is:

1. A method for automated monitoring of rectangular visual artifacts (MBAs) in block-compressed digital videos presented as analog video, comprising the steps of:

digitizing analog video into at least one digital image memory having a digital image size;

estimating video and compression block formats from the digital image size, the at least one digital image memory, and video parameters;

computing exclusion areas, of a digital image in the at least one digital image memory, that are excluded from further use based on the digital image size, the image memory, and the video parameters;

determining horizontal edges and vertical edges of potential MBAs;

locating a set of junctions where the horizontal edges and the vertical edges cross;
deleting, from the set of junctions, close junctions;
computing a score for each junction in the set of junctions based on neighboring junctions;
creating an array of horizontal projections of the horizontal edges;
suppressing peaks in the horizontal projections based on positions of the horizontal projections with respect to the horizontal edges, and based on amplitudes of the horizontal projections;
storing locations of the junctions, the scores, the array of horizontal projections, and the unsuppressed peaks, in a temporal sequence of the potential MBAs of feature memories;
applying a temporal filter to the temporal sequence to accept or reject the temporal sequence; and
detecting MBAs in the temporal sequence using a decision network; and
providing the MBAs by a computer signal.

2. The method as in claim 1 further comprising the step of:
selecting the analog video by a channel observer.

3. The method as in claim 2 further comprising the step of:
reporting the MBAs to the channel observer; and
receiving an updated channel selection from the channel observer based on the reported MBAs.

4. The method as in claim 1 further comprising the steps of:
estimating where a potential MBA could occur and potential MBA sizes from the digital image size, the black lines in the image memory, and the video parameters; and
recording the estimated locations and dimensions of the potential MBAs in a flexible macroblock grid (FMG).

5. The method as in claim 4 further comprising the step of:
horizontally and vertically differentiating the digital image in image memory to create an edge map including the horizontal edges and the vertical edges of potential MBAs.

6. The method as in claim 5 further comprising the step of:
computing the edge map based on a local intensity and a color digital derivative magnitude of edges of the potential MBA.

7. A non-transitory computer readable medium for carrying out the method as in claim 1.

8. A node in a computer network for carrying out the method as in claim 1.

9. A computer network having a node for carrying out the method as in claim 1.

10. A system for automated monitoring of rectangular visual artifacts (MBAs) in block-compressed digital videos presented as analog video, comprising:
a digitizer digitizing analog video into at least one image memory having an image size;
an FMG builder
estimating video and compression block formats based on said image size, said at least one image memory, and video parameters;
computing exclusion areas, of a digital image in said at least one image memory, that are excluded from further use based on said digital image size, said at least one image memory, and said video parameters; and
determining horizontal edges and vertical edges of potential MBAs;
a junction detector
locating a set of junctions where said horizontal edges and said vertical edges cross;
deleting, from said set of junctions, close junctions;
computing a score for each junction in said set of junctions based on neighboring junctions; and
storing locations of said junctions and said scores in a temporal sequence of said potential MBAs of feature memories;
a projection detector
creating an array of horizontal projections of said horizontal edges;
suppressing peaks in said horizontal projections based on positions of said horizontal projections with respect to said horizontal edges, and based on amplitudes of said horizontal projections; and
storing said array of horizontal projections and the unsuppressed peaks, in a temporal sequence of said potential MBAs of said feature memories;
a temporal filter applied to said temporal sequence to accept or reject said temporal sequence; and
a decision network detecting the MBAs in said temporal sequence and providing the MBAs by a computer signal.

11. The system as in claim 10 further comprising:
a channel observer selecting said analog video.

12. The system as in claim 11 wherein said decision network reports the MBAs to said channel observer; and wherein a set top box receives an updated channel selection from said channel observer based on the MBAs.

13. The system as in claim 10 wherein said FMG builder
estimates where a potential MBA could occur and potential MBA sizes from said image size, black lines in said image memory, and said video parameters; and
records said estimated locations and dimensions of possible MBAs in a flexible macroblock grid (FMG).

14. The system as in claim 10 wherein said FMG builder horizontally and vertically differentiates said digital image in image memory to create an edge map including said horizontal edges and said vertical edges of said potential MBAs.

15. The system as in claim 10 wherein said FMG builder computes said edge map based on a local intensity and a color digital derivative magnitude of edges of said potential MBA.

16. A method for automated monitoring of rectangular visual artifacts (MBAs) in block-compressed digital videos presented as an analog signal, comprising the steps of:
(a) accessing information from a digital video distribution to monitor a video channel;
(b) selecting, decoding, and decompressing the information into the analog signal;
(c) digitizing the analog signal
(d) storing a digitized image of the analog signal into at least one image memory;
(e) obtaining a digitized image size from the digitized image;
(f) accessing video parameters;
(g) estimating dimensions and locations of possible MBAs from the digitized image size, the video parameters, and the black lines in the at least one image memory;
(h) computing exclusion areas of the digital image to exclude from further use, based on the digitized image size, the video parameters, and black lines on the edges of the at least one image memory;
(i) creating a flexible macroblock grid (FMG) to indicate possible positions of potential MBAs based on the estimated dimensions, the estimated locations, and the exclusion areas;
(j) for each of the digitized images, determining locations of vertical edges of the potential MBAs based on the FMG;

(k) differentiating digital image intensity/color of the digitized images to detect horizontal edges and vertical edges and suppress other image structure to create an edge image;

(l) transforming the edge image into an edge map to remove low contrast edges from consideration;

(m) locating junctions where the horizontal edges and vertical edges cross in the edge map, the junctions being in proximity to the locations and the dimensions in the FMG;

(n) removing or suppressing the close junctions;

(o) assigning a score to each of the unsuppressed junctions based neighboring junctions and the dimensions;

(p) storing the locations and the scores of the remaining junctions in feature memories as a function of time;

(q) vertically differentiating the digitized image to create a horizontal edge;

(r) integrating the horizontal edge to create a horizontal projection array;

(s) updating the horizontal projection array to remove peaks that are further than a preselected distance from the locations based on the FMG;

(t) modifying the updated horizontal projection array to remove the peaks that are less than a preselected value;

(u) searching the modified horizontal projection array to find the peaks that are near horizontal edges of the locations from the FMG;

(v) storing the horizontal projection array and the near peaks in the feature memories as a function of time;

(w) temporally filtering a sequence of the junctions and the projections in the feature memories to discard sequences of the potential MBAs that are shorter than a preselected minimum time or longer than a preselected maximum time;

(x) reporting sequences that are not filtered out by said step of temporally filtering to a decision network;

(y) determining, by the decision network, whether there are MBAs in the digitized image based on the junctions and the projections data in the filtered feature memories and decision parameters; and (z) raising signals based on occurrence of the MBAs.

17. The method as in claim 16 further comprising the step of:

selecting a video channel and a channel monitoring duration by a channel observer.

18. The method as in claim 17 further comprising the step of:

changing the behavior of the channel observer such that channels where MBAs are detected are monitored more frequently and for a longer duration.

19. The method as in claim 17 further comprising the step of:

signaling a video provider and the channel observer when a signal is raised.

* * * * *